US010377312B2

(12) United States Patent
Takada et al.

(10) Patent No.: US 10,377,312 B2
(45) Date of Patent: Aug. 13, 2019

(54) IMAGE DISPLAY MIRROR FOR A VEHICLE

(71) Applicant: NITTO DENKO CORPORATION, Ibaraki-shi, Osaka (JP)

(72) Inventors: Katsunori Takada, Ibaraki (JP); Tadayuki Kameyama, Ibaraki (JP); Yoshitsugu Kitamura, Ibaraki (JP); Keisuke Kimura, Ibaraki (JP); Hiroki Kuramoto, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 133 days.

(21) Appl. No.: 14/994,620

(22) Filed: Jan. 13, 2016

(65) Prior Publication Data

US 2016/0200256 A1 Jul. 14, 2016

(30) Foreign Application Priority Data

Jan. 14, 2015 (JP) ................................ 2015-005098

(51) Int. Cl.
*B60R 1/08* (2006.01)
*B60R 1/12* (2006.01)
(Continued)

(52) U.S. Cl.
CPC ................ *B60R 1/12* (2013.01); *B60R 1/083* (2013.01); *B60R 1/084* (2013.01); *B60R 1/088* (2013.01);
(Continued)

(58) Field of Classification Search
None
See application file for complete search history.

(56) References Cited

U.S. PATENT DOCUMENTS 5,853,240 A * 12/1998 Tanaka .............. G02B 27/0172 348/E5.141
7,502,156 B2 * 3/2009 Tonar ..................... B60R 1/088 359/265
(Continued)

FOREIGN PATENT DOCUMENTS

CN 1755406 A 4/2006
CN 102887114 A 1/2013
(Continued)

OTHER PUBLICATIONS

Extended (Supplementary) European Search Report (EESR) dated Jun. 10, 2016, issued in counterpart European Patent Application No. 16151040.9. (8 pages).
(Continued)

*Primary Examiner* — Ryan Crockett
(74) *Attorney, Agent, or Firm* — Westerman, Hattori, Daniels & Adrian, LLP

(57) ABSTRACT

Provided is an image display mirror that includes a half mirror and an image display apparatus, reduces an influence of a reflected image provided by the half mirror, and is excellent in visibility of an image displayed on the image display apparatus. The image display mirror for a vehicle includes a first polarizing plate, a half mirror, and an image display apparatus in the stated order from a viewer side. In one embodiment, the first polarizing plate includes a polarizer, and the direction of the polarizer of the first polarizing plate is set so that the transmittance of light output from the image display apparatus that is transmitted through the first polarizing plate becomes maximum.

6 Claims, 2 Drawing Sheets

(51) Int. Cl.

| | |
|---|---|
| ***G02B 5/08*** | (2006.01) |
| ***G02B 5/30*** | (2006.01) |
| ***G02B 27/14*** | (2006.01) |
| ***G02B 27/28*** | (2006.01) |

(52) U.S. Cl.

CPC ......... *G02B 5/3083* (2013.01); *G02B 27/144* (2013.01); *G02B 27/281* (2013.01); *B60R 2001/1215* (2013.01); *G02B 5/08* (2013.01); *G02B 5/30* (2013.01)

(56) References Cited

U.S. PATENT DOCUMENTS

| | | | | |
|---|---|---|---|---|
| 7,679,809 | B2 * | 3/2010 | Tonar | B60R 1/088 359/265 |
| 7,916,380 | B2 | 3/2011 | Tonar et al. | |
| 8,282,224 | B2 | 10/2012 | Anderson et al. | |
| 8,545,030 | B2 | 10/2013 | Anderson et al. | |
| 8,704,892 | B2 | 4/2014 | Taguchi et al. | |
| 9,254,789 | B2 | 2/2016 | Anderson et al. | |
| 9,684,204 | B2 | 6/2017 | Sakai et al. | |
| 9,910,310 | B2 | 3/2018 | Tonar et al. | |
| 2005/0207020 | A1 * | 9/2005 | Kawamura | G02B 5/3083 359/634 |
| 2006/0007550 | A1 | 1/2006 | Tonar et al. | |
| 2006/0072057 | A1 | 4/2006 | Yano et al. | |
| 2006/0098137 | A1 * | 5/2006 | Kameyama | G02B 5/3033 349/96 |
| 2007/0139772 | A1 * | 6/2007 | Wang | G02B 5/3083 359/487.03 |
| 2007/0146481 | A1 * | 6/2007 | Chen | B60R 1/12 348/148 |
| 2008/0180596 | A1 * | 7/2008 | Fujimoto | G02B 27/0172 349/62 |
| 2009/0002575 | A1 * | 1/2009 | Yamada | B60R 1/04 349/1 |
| 2009/0002822 | A1 | 1/2009 | Tonar et al. | |
| 2009/0296190 | A1 * | 12/2009 | Anderson | B32B 27/06 359/247 |
| 2010/0110553 | A1 | 5/2010 | Anderson et al. | |
| 2010/0165437 | A1 | 7/2010 | Tonar et al. | |
| 2010/0245701 | A1 * | 9/2010 | Sato | B60R 1/12 349/56 |
| 2010/0277786 | A1 * | 11/2010 | Anderson | G02F 1/133536 359/247 |
| 2012/0140074 | A1 | 6/2012 | Taguchi et al. | |
| 2013/0106922 | A1 * | 5/2013 | Chen | G02F 1/133514 345/690 |
| 2014/0036339 | A1 | 2/2014 | Tonar et al. | |
| 2014/0347488 | A1 | 11/2014 | Tazaki et al. | |
| 2016/0026039 | A1 | 1/2016 | Sakai et al. | |
| 2016/0178964 | A1 * | 6/2016 | Sakai | G02F 1/133536 345/592 |
| 2016/0193963 | A1 | 7/2016 | Anderson et al. | |
| 2016/0200255 | A1 * | 7/2016 | Takada | B60R 1/12 359/488.01 |
| 2016/0221506 | A1 * | 8/2016 | Takada | B60R 1/083 |
| 2016/0221507 | A1 * | 8/2016 | Takada | B60R 1/12 |
| 2016/0221508 | A1 * | 8/2016 | Takada | B60R 1/084 |
| 2016/0221509 | A1 * | 8/2016 | Takada | G02F 1/133536 |
| 2016/0252770 | A1 | 9/2016 | Tonar et al. | |

FOREIGN PATENT DOCUMENTS

| | | | |
|---|---|---|---|
| DE | 196 31 409 | A1 | 2/1998 |
| JP | 60-169620 | U | 11/1985 |
| JP | 11-183895 | A | 7/1999 |
| JP | 2009-529452 | A | 8/2009 |
| JP | 2011-145331 | A | 7/2011 |
| JP | 2011-527773 | A | 11/2011 |
| JP | 2012-116357 | A | 6/2012 |
| JP | 5273286 | B1 | 8/2013 |
| JP | 2014/201146 | * | 10/2014 |
| WO | WO 94/20331 | * | 9/1994 |
| WO | 2007/103573 | A2 | 9/2007 |
| WO | 2014/112525 | A1 | 7/2014 |

OTHER PUBLICATIONS

Office Action dated Aug. 15, 2018, issued in counterpart Japanese Application No. 2015-005098, with English translation. (11 pages).

Office Action dated Apr. 2, 2019, issued in counterpart JP Application No. 2015-005098, with English translation. (12 pages).

Office Action dated Mar. 20, 2019, issued in counterpart CN Application No. 201610016407.2, with English translation. (20 pages).

* cited by examiner

IMAGE DISPLAY MIRROR FOR A VEHICLE

This application claims priority under 35 U.S.C. Section 119 to Japanese Patent Application No. 2015-005098 filed on Jan. 14, 2015, which is herein incorporated by references.

BACKGROUND OF THE INVENTION

1. Field of the Invention

The present invention relates to an image display mirror for a vehicle.

2. Description of the Related Art

A technology involving combining a rear-view mirror for a vehicle with an image display apparatus to display an image has heretofore been known. For example, Japanese Patent No. 5273286 discloses an image display mirror including a half mirror arranged on the front surface (viewer side surface) of a monitor. In the image display mirror, the rear can be viewed with a reflected image provided by the half mirror. Meanwhile, when an image is displayed on the monitor, the image can be viewed through the half mirror.

Such image display mirror involves a problem in that, for example, when the quantity of light from the rear of a vehicle is large, the reflected image inhibits the visibility of the image displayed on the monitor. Japanese Patent No. 5273286 proposes the following technology. An influence of the reflected image is reduced by making the angle of the half mirror when a viewer (occupant) views the rear and the angle when the viewer views the image of the monitor different from each other. According to such technology, the influence of the reflected image provided by the half mirror can be reduced by adjusting the angle of the half mirror so that when the monitor image is viewed, the reflected image becomes an image that does not inhibit the visibility of the monitor image, specifically so that a ceiling is mirrored by reflection.

However, when it is difficult to turn the reflected image provided by the half mirror into the image that does not inhibit the visibility of the monitor image, e.g., when the image display mirror of Japanese Patent No. 5273286 is applied to a vehicle including a ceiling that transmits light, such as a panoramic roof or a sunroof, or a convertible car, the influence of the reflected image cannot be reduced by the mirror.

SUMMARY OF THE INVENTION

The present invention has been made to solve the conventional problems, and an object of the present invention is to provide an image display mirror that includes a half mirror and an image display apparatus, reduces an influence of a reflected image provided by the half mirror, and is excellent in visibility of an image displayed on the image display apparatus.

An image display mirror for a vehicle according to one embodiment of the present invention includes a first polarizing plate, a half mirror, and an image display apparatus in the stated order from a viewer side.

In one embodiment of the present invention, the first polarizing plate includes a polarizer, and a direction of an absorption axis of the polarizer is set so that a transmittance of light output from the image display apparatus that is transmitted through the first polarizing plate becomes maximum.

In one embodiment of the present invention, the image display apparatus includes a second polarizing plate including a polarizer, and an absorption axis of the polarizer of the second polarizing plate and the absorption axis of the polarizer of the first polarizing plate are substantially parallel to each other.

In one embodiment of the present invention, the first polarizing plate and the half mirror are brought into close contact with each other by interlayer filling.

In one embodiment of the present invention, the half mirror and the image display apparatus are brought into close contact with each other by interlayer filling.

In one embodiment of the present invention, the image display mirror for a vehicle further includes a λ/4 plate on a viewer side of the first polarizing plate.

In one embodiment of the present invention, the image display apparatus includes a liquid crystal display apparatus including a liquid crystal cell, and the liquid crystal display apparatus is free of a polarizing plate on a viewer side of the liquid crystal cell.

In one embodiment of the present invention, an angle formed between a reflection surface of the half mirror and an image display surface of the image display apparatus is more than 0° and 45° or less.

According to the embodiment of the present invention, the image display mirror includes the polarizing plate (first polarizing plate), the half mirror, and the image display apparatus in the stated order from the viewer side. Thus, the image display mirror that reduces an influence of a reflected image provided by the half mirror, and is excellent in visibility of a image displayed on the image display apparatus can be provided.

DETAILED DESCRIPTION OF THE PREFERRED EMBODIMENTS

Embodiments of the present invention are hereinafter described with reference to the drawings. However, the present invention is not limited to these embodiments.

A. Overall Construction of Image Display Mirror for a Vehicle

Figure 1:
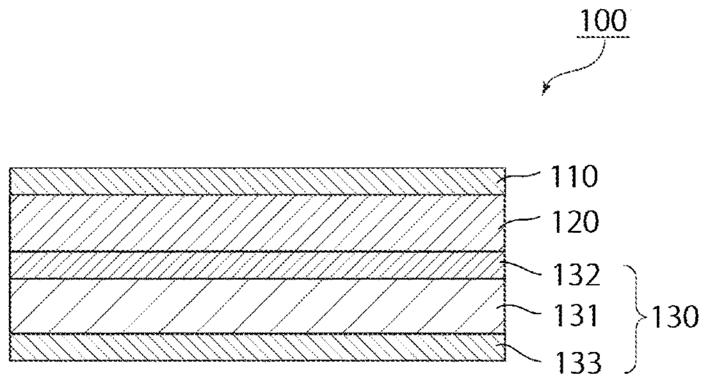
FIG. 1 is a schematic sectional view of an image display mirror according to one embodiment of the present invention.

FIG. 1 is a schematic sectional view of an image display mirror according to one embodiment of the present invention. An image display mirror 100 for a vehicle includes a first polarizing plate 110, a half mirror 120, and an image display apparatus 130 in the stated order from a viewer side. The image display mirror for a vehicle of this embodiment can be used as, for example, the rear-view mirror (room mirror) of a vehicle. The half mirror 120 has a light-reflecting function and a light-transmitting function. The image display mirror 100 for a vehicle enables an occupant of the vehicle to view the rear by virtue of the light-reflecting function of the half mirror 120. In addition, in the image display mirror 100 for a vehicle, an image displayed on the image display apparatus 130 can be viewed by virtue of the light-transmitting function of the half mirror 120. The image display apparatus 130 displays, for example, an image provided by an external camera that mirrors the rear of the vehicle. With such construction, even, for example, when an obstacle (such as a passenger or baggage) is present in the vehicle and hence the rear of the vehicle cannot be sufficiently observed with the reflected image of the half mirror, the safety of the vehicle can be secured by displaying the image provided by the external camera on the image display apparatus.

The first polarizing plate 110 is preferably arranged so that as large a quantity as possible of light output from the image display apparatus is transmitted through the first polarizing plate. More specifically, it is preferred that the first polarizing plate including a polarizer be used and the direction of the absorption axis of the polarizer be set so that the transmittance of the light output from the image display apparatus that is transmitted through the first polarizing plate becomes maximum. An example of such embodiment is an image display mirror for a vehicle that uses the image display apparatus including a second polarizing plate 132 including a polarizer, and is configured so that the absorption axis of the polarizer of the second polarizing plate 132 and the absorption axis of the polarizer of the first polarizing plate 110 are substantially parallel to each other. It should be noted that the expression "substantially parallel" includes the case where an angle formed between the two directions is 0°±10°, and the angle is preferably 0°±7°, more preferably 0°±5°.

Figure 2:
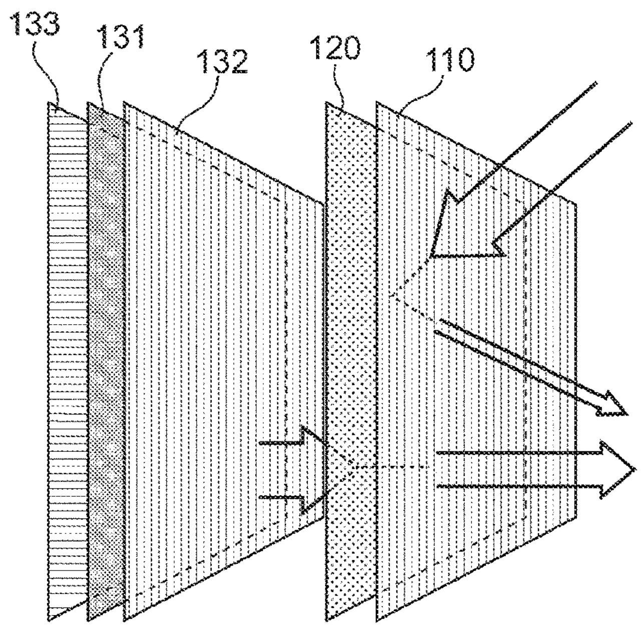
FIG. 2 is a schematic view for illustrating an action according to the one embodiment of the present invention.

FIG. 2 is a schematic view for illustrating an action according to the one embodiment of the present invention. In the present invention, the first polarizing plate 110 is arranged on the viewer side of the half mirror 120, and hence an influence of the reflected image provided by the half mirror is reduced and the visibility of the image displayed on the image display apparatus 130 can be improved. More specifically, the path of light from the viewer side reflected by the half mirror 120 is as follows: the light passes the first polarizing plate twice at the time of its incidence and after the reflection. Thus, the quantity of the light from the viewer side reduces. On the other hand, the path of light from aback surface side that is transmitted through the half mirror (i.e., the light output from the image display apparatus 130) is as follows: the light passes the first polarizing plate only once. According to the present invention, the extent to which the quantity of the light from the viewer side reduces can be made larger than the extent to which the quantity of the light from the back surface side reduces. As a result, an image display mirror for a vehicle that is reduced in influence of a reflected image and hence facilitates the viewing of the image of the image display apparatus can be provided. Further, when the first polarizing plate is arranged so that as large a quantity as possible of the light output from the image display apparatus is transmitted through the first polarizing plate as described above, the quantity of the light from the back surface side that is transmitted through the first polarizing plate (i.e., the light output from the image display apparatus 130) increases, and hence the effects of the present invention become additionally significant. It should be noted that under a state in which no image is displayed on the image display apparatus, the reflected image provided by the half mirror can be viewed because the quantity of light incident from the back surface to be transmitted through the half mirror is substantially zero.

The first polarizing plate and the half mirror, and/or the half mirror and the image display apparatus may be brought into contact with each other or may be out of contact with each other. It is preferred that a gap between the first polarizing plate and the half mirror be filled with a transparent resin, and both the members be brought into close contact with each other. Similarly, a gap between the half mirror and the image display apparatus is preferably filled with a transparent resin. When the first polarizing plate and the half mirror, and/or the half mirror and the image display apparatus are brought into close contact with each other as described above, an image display mirror for a vehicle excellent in efficiency with which light is utilized and excellent in visibility of a displayed image can be obtained. Any appropriate resin film, pressure-sensitive adhesive, or the like can be used in interlayer filling. A pressure-sensitive adhesive excellent in transparency is preferably used as the pressure-sensitive adhesive. Examples thereof include an acrylic pressure-sensitive adhesive, a silicone-based pressure-sensitive adhesive, and a rubber-based pressure-sensitive adhesive.

A λ/4 plate can be arranged on the viewer side (i.e., the side opposite to the half mirror) of the first polarizing plate. The λ/4 plate has a function of transforming linearly polarized light into circularly polarized light (or circularly polarized light into linearly polarized light) by arranging its slow axis at an angle of about +45° or about −45° relative to the absorption axis of the first polarizing plate (details are described later). The arrangement of the λ/4 plate can provide an image display mirror for a vehicle excellent in visibility for a user of a pair of polarized sunglasses. It should be noted that the λ/4 plate may be brought into contact with the first polarizing plate or may be out of contact therewith. In addition, the λ/4 plate and the first polarizing plate may be bonded to each other through a pressure-sensitive adhesive layer. Further, the λ/4 plate may be arranged removably and attachably.

Figure 3A:
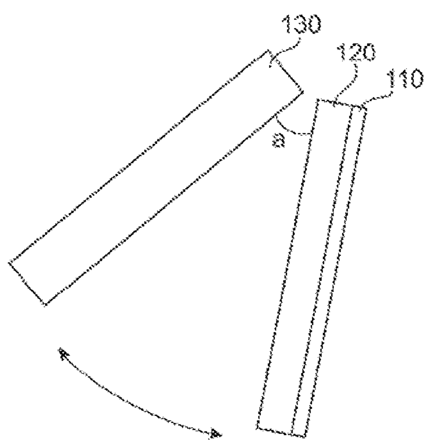
FIG. 3A and FIG. 3B are each a schematic sectional view of an image display mirror according to another embodiment of the present invention.
Figure 3B:
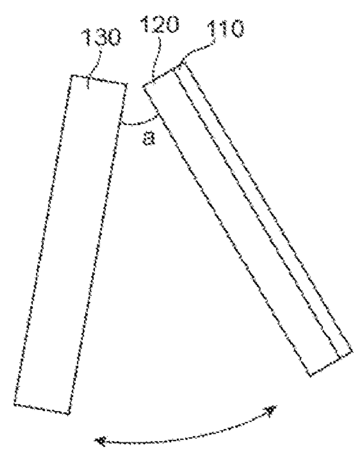

In one embodiment, as illustrated in each of FIG. 3A and FIG. 3B, an angle a formed between the reflection surface of the half mirror and the image display surface of the image display apparatus is set to be more than 0° and 45° or less. In the image display mirror for a vehicle of such construction, the orientation of the half mirror when an occupant attempts to view a reflected image (i.e., when the half mirror mirrors the rear as the reflected image) as illustrated in FIG. 3A, and the orientation of the half mirror when the occupant attempts to view an image displayed on the image display apparatus (i.e., when the occupant wishes to suppress an influence of the reflected image of the half mirror) as illustrated in FIG. 3B can be made different from each other by changing the orientation of the image display mirror for a vehicle. With such construction, the influence of the reflected image is reduced and hence the image of the image display apparatus becomes easy to view in some cases. In this embodiment, the angle formed between the reflection surface of the half mirror and the image display surface of the image display apparatus is preferably from 5° to 40°, more preferably from 10° to 30°.

B. First Polarizing Plate

The polarizing plate typically has a polarizer and a protective layer arranged on one side, or each of both sides, of the polarizer. The polarizer is typically an absorption-type polarizer.

The transmittance (also referred to as "single axis transmittance") of the polarizer at a wavelength of 589 nm is preferably 41% or more, more preferably 42% or more. It should be noted that a theoretical upper limit for the single axis transmittance is 50%. In addition, its polarization degree is preferably from 99.5% to 100%, more preferably from 99.9% to 100%.

Any appropriate polarizer may be used as the polarizer. Examples thereof include: a polarizer obtained by adsorbing a dichroic substance, such as iodine or a dichroic dye, onto a hydrophilic polymer film, such as a polyvinyl alcohol-based film, a partially formalized polyvinyl alcohol-based film, or an ethylene-vinyl acetate copolymer-based partially saponified film, and subjecting the resultant film to uniaxial stretching; and polyene-based alignment films, such as a dehydrated product of polyvinyl alcohol and a dehydrochlorinated product of polyvinyl chloride. Of those, a polarizer obtained by adsorbing a dichroic substance, such as iodine, onto a polyvinyl alcohol-based film and subjecting the resultant film to uniaxial stretching is particularly preferred because of its high polarized dichromaticity. The polarizer has a thickness of preferably from 0.5 μm to 80 μm.

The polarizer obtained by adsorbing iodine onto a polyvinyl alcohol-based film and subjecting the resultant film to uniaxial stretching is typically produced by dyeing polyvinyl alcohol through immersion in an aqueous solution of iodine and stretching the resultant film at a ratio of from 3 times to 7 times with respect to its original length. The stretching may be carried out after the dyeing, the stretching may be carried out during the dyeing, or the stretching may be carried out before the dyeing. The polarizer may be produced by subjecting the film to treatments such as swelling, cross-linking, adjusting, washing with water, and drying in addition to the stretching and the dyeing.

Any appropriate film may be used as the protective layer. As a material for the main component of such film, there are specifically given, for example: cellulose-based resins, such as triacetylcellulose (TAC); and transparent resins, such as (meth) acrylic, polyester-based, polyvinyl alcohol-based, polycarbonate-based, polyamide-based, polyimide-based, polyether sulfone-based, polysulfone-based, polystyrene-based, polynorbornene-based, polyolefin-based, or acetate-based transparent resins. In addition, examples thereof further include thermosetting resins and UV curable resins, such as acrylic, urethane-based, acrylic urethane-based, epoxy-based, or silicone-based thermosetting resins and UV curable resins. In addition, examples thereof further include glassy polymers, such as a siloxane-based polymer. In addition, a polymer film described in Japanese Patent Application Laid-open No. 2001-343529 (International Patent WO01/37007A) may also be used. For example, a resin composition containing a thermoplastic resin having in its side chain a substituted or unsubstituted imide group and a thermoplastic resin having in its side chain a substituted or unsubstituted phenyl group and a nitrile group may be used as a material for the film. An example thereof is a resin composition containing an alternating copolymer formed of isobutene and N-methylmaleimide and an acrylonitrile-styrene copolymer. The polymer film may be, for example, an extruded product of the resin composition.

C. Half Mirror

Any appropriate mirror can be used as the half mirror as long as the mirror can transmit part of incident light and reflect other part thereof. Examples thereof include: a half mirror including a transparent base material and a metal thin film formed on the transparent base material; and a half mirror including a transparent base material and a dielectric multilayer film formed on the transparent base material. The half mirror is preferably free of a polarization function from the viewpoint that the effect of arranging the first polarizing plate is efficiently obtained.

Any appropriate material can be used as a material for constituting the transparent base material. Examples of the material include: transparent resin materials, such as polymethyl methacrylate, polycarbonate, and an epoxy resin; and glass. The thickness of the transparent base material is, for example, from 20 μm to 5,000 μm. The transparent base material is preferably free of a retardation.

A metal having a highlight reflectance can be used as a material for constituting the metal thin film, and examples thereof include aluminum, silver, and tin. The metal thin film can be formed by, for example, plating or vapor deposition. The thickness of the metal thin film is, for example, from 2 nm to 80 nm, preferably from 3 nm to 50 nm.

In the dielectric multilayer film, a high-refractive index material and a low-refractive index material each having a predetermined thickness are laminated so that the film has a function as a mirror. The high-refractive index material and the low-refractive index material are preferably laminated in an alternate manner, and the function as the half mirror is expressed by utilizing the interference of light beams occurring upon their incidence from the low-refractive index material to the high-refractive index material. The half mirror including the dielectric multilayer film is preferred because its absorption of light is reduced.

The high-refractive index material has a refractive index of preferably more than 2.0, more preferably more than 2.0 and 3.0 or less. Specific examples of the high-refractive index material include ZnS-$SiO_2$, $TiO_2$, $ZrO_2$, and $Ta_2O_3$. The low-refractive index material has a refractive index of preferably from 1.2 to 2.0, more preferably from 1.4 to 1.9. Specific examples of the low-refractive index material include $SiO_2$, $Al_2O_3$, and MgF.

The visible light reflectance of the half mirror is preferably from 20% to 80%, more preferably from 30% to 70%, still more preferably from 40% to 60%. In addition, the visible light transmittance of the half mirror is preferably from 20% to 80%, more preferably from 30% to 70%, still more preferably from 40% to 60%. The visible light reflectance, the visible light transmittance, and a ratio therebetween (described later) can be adjusted by controlling the thickness of the metal thin film or the dielectric multilayer film.

The ratio between the visible light reflectance and visible light transmittance of the half mirror (reflectance:transmittance) is preferably from 2:8 to 8:2, more preferably from 3:7 to 7:3, still more preferably from 4:6 to 6:4. The ratio between the visible light reflectance and the visible light transmittance can be appropriately adjusted in accordance with, for example, the brightness of the image display apparatus.

D. Image Display Apparatus

Any appropriate apparatus can be used as the image display apparatus. Examples thereof include a liquid crystal display apparatus, an organic EL display apparatus, and a plasma display apparatus. Description is given below by taking the liquid crystal display apparatus as a typical example. In one embodiment, as illustrated in FIG. 1, the liquid crystal display apparatus includes a liquid crystal panel including a liquid crystal cell 131, the second polarizing plate 132 arranged on the viewer side of the liquid crystal cell 131, and a third polarizing plate 133 placed on the back surface side of the liquid crystal cell 131. Although not shown, the image display apparatus can include any appropriate other member (such as a backlight unit) as required. In this embodiment, the second polarizing plate and the third polarizing plate can be arranged so that the absorption axes of their respective polarizers are substantially perpendicular or parallel to each other to enable the viewing of an image.

D-1. Liquid Crystal Cell

The liquid crystal cell 131 has a pair of substrates and a liquid crystal layer serving as a display medium sandwiched between the substrates. In a general construction, a color filter and a black matrix are arranged on one of the substrates, and a switching element for controlling the electrooptical characteristics of a liquid crystal, a scanning line for providing the switching element with a gate signal and a signal line for providing the element with a source signal, and a pixel electrode and a counter electrode are arranged on the other substrate. An interval between the substrates (cell gap) can be controlled with, for example, a spacer. For example, an alignment film formed of polyimide can be arranged on the side of each of the substrates to be brought into contact with the liquid crystal layer.

In one embodiment, the liquid crystal layer contains liquid crystal molecules aligned in a homogeneous array under a state in which no electric field is present. Such liquid crystal layer (resultantly the liquid crystal cell) typically shows a three-dimensional refractive index of nx>ny=nz. It should be noted that the expression "ny=nz" as used herein includes not only the case where ny and nz are completely equal to each other but also the case where ny and nz are substantially equal to each other. Typical examples of a driving mode using the liquid crystal layer showing such three-dimensional refractive index include an in-plane switching (IPS) mode and a fringe field switching (FFS) mode. It should be noted that the IPS mode includes a super in-plane switching (S-IPS) mode and an advanced super in-plane switching (AS-IPS) mode each adopting a V-shaped electrode, a zigzag electrode, or the like. In addition, the FFS mode includes an advanced fringe field switching (A-FFS) mode and an ultra fringe field switching (U-FFS) mode each adopting a V-shaped electrode, a zigzag electrode, or the like.

In another embodiment, the liquid crystal layer contains liquid crystal molecules aligned in a homeotropic array under a state in which no electric field is present. Such liquid crystal layer (resultantly the liquid crystal cell) typically shows a three-dimensional refractive index of nz>nx=ny. A driving mode using the liquid crystal molecules aligned in the homeotropic array under a state in which no electric field is present is, for example, a vertical alignment (VA) mode. The VA mode includes a multi-domain VA (MVA) mode.

D-2. Second Polarizing Plate and Third Polarizing Plate

Such polarizing plate as described in the section B is used as each of the second polarizing plate and the third polarizing plate.

In one embodiment, the second polarizing plate 132 is omitted from the image display apparatus (liquid crystal display apparatus) 130 illustrated in FIG. 1. That is, in this embodiment, a liquid crystal display apparatus free of a polarizing plate on the viewer side of its liquid crystal cell is used. In this case, the first polarizing plate and the third polarizing plate are arranged so that the absorption axes of their respective polarizers are substantially perpendicular or parallel to each other to enable the viewing of an image. In this embodiment, the brightness of the image display mirror for a vehicle can be improved because an optical loss due to the second polarizing plate can be eliminated.

E. λ/4 Plate

In one embodiment, as described above, the λ/4 plate is arranged on the viewer side (i.e., the side opposite to the half mirror) of the first polarizing plate.

A front retardation $R_0$ of the λ/4 plate at a wavelength of 590 nm is from 90 nm to 190 nm, preferably from 100 nm to 180 nm, more preferably from 110 nm to 170 nm. It should be noted that the front retardation $R_0$ in this specification is determined from the equation "$R_0=(nx-ny)\times d$" where nx represents a refractive index in the direction in which an in-plane refractive index becomes maximum (i.e., a slow axis direction), ny represents a refractive index in a direction perpendicular to the slow axis in a plane (i.e., a fast axis direction), and d (nm) represents the thickness of a retardation film; these parameters are values under 23° C. The λ/4 plate shows any appropriate refractive index ellipsoid as long as the plate has the relationship of nx>ny. For example, the refractive index ellipsoid of the λ/4 plate shows the relationship of nx>nz>ny or nx>ny>nz.

An angle between the absorption axis of the polarizer of the first polarizing plate and the slow axis of the λ/4 plate is preferably from +40° to +50° or from −40° to −50°, more preferably from +43° to +47° or from −43° to −47°, still more preferably +45° or −45° . When the first polarizing plate and the λ/4 plate are arranged so as to show such relationship, the laminated structure of the first polarizing plate and the λ/4 plate can function as a circularly polarizing plate.

Any appropriate material can be used as a material for constituting the λ/4 plate as long as the effects of the present invention are obtained. A typical example thereof is a stretched film of a polymer film. Examples of a resin for forming the polymer film include a polycarbonate-based resin and a cycloolefin-based resin. A method of producing the λ/4 plate is not particularly limited, but the λ/4 plate can be obtained by, for example, stretching the polymer film at a temperature of from about 100° C. to about 250° C. and at a stretching ratio of from about 1.1 times to about 2.5 times. The front retardation and thickness direction retardation of the λ/4 plate can be controlled by adjusting the stretching ratio and stretching temperature of the polymer film. The thickness and total light transmittance of the λ/4 plate are preferably about 200 μm or less and 80% or more, respectively, though the thickness and the total light transmittance are not particularly limited thereto.

What is claimed is:

1. An image display mirror for a vehicle, comprising:

a first polarizing plate, a half mirror, and an image display apparatus in the stated order from a viewer side, wherein the first polarizing plate includes an absorption-type polarizer, wherein the half mirror does not have a polarization function, wherein the image display apparatus includes a second polarizing plate including a polarizer, and wherein an absorption axis of the polarizer of the second polarizing plate and the absorption axis of the polarizer of the first polarizing plate are substantially parallel to each other.

2. The image display mirror for a vehicle according to claim 1, wherein:

a direction of an absorption axis of the absorption-type polarizer is set so that a transmittance of light output from the image display apparatus that is transmitted through the first polarizing plate becomes maximum.

3. The image display mirror for a vehicle according to claim 1, wherein the first polarizing plate and the half mirror are brought into close contact with each other by interlayer filling.

4. The image display mirror for a vehicle according to claim 1, wherein the half mirror and the image display apparatus are brought into close contact with each other by interlayer filling.

5. The image display mirror for a vehicle according to claim 1, further comprising a λ/4 plate on a viewer side of the first polarizing plate.

6. The image display mirror for a vehicle according to claim 1, wherein an angle formed between a reflection surface of the half mirror and an image display surface of the image display apparatus is more than 0° and 45° or less.

* * * * *